(12) United States Patent
Schuette et al.

(10) Patent No.: US 9,904,330 B2
(45) Date of Patent: Feb. 27, 2018

(54) BASE BOARD ARCHITECTURE FOR A SERVER COMPUTER AND METHOD THEREFOR

(71) Applicant: Sanmina Corporation, San Jose, CA (US)

(72) Inventors: Franz Michael Schuette, Colorado Springs, CO (US); Lawrence Allan Freymuth, Colorado Springs, CO (US); Ritesh Kumar, Colorado Springs, CO (US)

(73) Assignee: Sanmina Corporation, San Jose, CA (US)

(*) Notice: Subject to any disclaimer, the term of this patent is extended or adjusted under 35 U.S.C. 154(b) by 321 days.

(21) Appl. No.: 14/732,559

(22) Filed: Jun. 5, 2015

(65) Prior Publication Data

US 2016/0103472 A1 Apr. 14, 2016

Related U.S. Application Data

(60) Provisional application No. 62/062,400, filed on Oct. 10, 2014.

(51) Int. Cl.
*G06F 13/00* (2006.01)
*G06F 1/18* (2006.01)

(52) U.S. Cl.
CPC .............. *G06F 1/189* (2013.01); *G06F 1/185* (2013.01); *G06F 1/187* (2013.01)

(58) Field of Classification Search
CPC ........... G06F 1/189; G06F 1/185; G06F 1/187
USPC .......................... 710/301–304, 100; 361/792
See application file for complete search history.

(56) References Cited

U.S. PATENT DOCUMENTS

| | | | | |
|---|---|---|---|---|
| 3,477,848 A | * | 11/1969 | Pritchard, Jr. | ............ C23F 1/02 430/22 |
| 4,307,438 A | * | 12/1981 | Grubb | ..................... H05K 1/148 361/784 |
| 4,492,460 A | * | 1/1985 | Considine | ................. G03F 1/90 355/132 |
| 5,148,389 A | * | 9/1992 | Hughes | ............... G06F 12/0676 710/104 |
| 5,201,038 A | * | 4/1993 | Fielder | ................ G06F 13/4095 439/74 |
| 5,463,589 A | * | 10/1995 | Gruender, Jr. | ...... G06F 12/0661 345/566 |
| 5,583,998 A | * | 12/1996 | Bowman | ............... G06F 13/409 710/100 |

(Continued)

OTHER PUBLICATIONS

Wikipedia definition of Daisy Chain Dec. 31, 2013.*

*Primary Examiner* — Paul R Myers
(74) *Attorney, Agent, or Firm* — Loza & Loza, LLP; Julio Loza; Heidi Eisenhut (57) ABSTRACT

One feature pertains to an advanced computer device configured for storing data on a plurality of non-volatile memory mass storage devices. The mass storage devices may interface with the computer device through a plurality of base boards mounted in an enclosure that are configured to couple with at least one non-volatile memory storage drive. Each base board may further be configured to couple with a high speed interconnect cable to exchange data to be loaded or stored with the computer device. According to one aspect, the high speed cable transfers Serially Attached SCSI (SAS) or PCIe data packets or frames.

20 Claims, 11 Drawing Sheets

(56) References Cited

U.S. PATENT DOCUMENTS

| | | | | |
|---|---|---|---|---|
| 5,726,922 | A * | 3/1998 | Womble | G06F 1/184 |
| | | | | 361/726 |
| 5,961,618 | A * | 10/1999 | Kim | G06F 13/409 |
| | | | | 710/300 |
| 6,261,104 | B1 * | 7/2001 | Leman | G06F 1/184 |
| | | | | 439/61 |
| 6,344,987 | B1 * | 2/2002 | Drobnik | G06F 1/266 |
| | | | | 363/123 |
| 8,352,649 | B2 * | 1/2013 | Liu | G06F 3/0617 |
| | | | | 710/316 |
| 2002/0085343 | A1 * | 7/2002 | Wu | G06F 1/1616 |
| | | | | 361/679.55 |
| 2004/0066615 | A1 * | 4/2004 | Pavesi | H05K 1/14 |
| | | | | 361/679.55 |
| 2005/0068754 | A1 * | 3/2005 | Corrado | H05K 7/1454 |
| | | | | 361/788 |
| 2006/0172614 | A1 * | 8/2006 | Ta | H05K 1/0287 |
| | | | | 439/835 |
| 2007/0198100 | A1 * | 8/2007 | Butters | G05B 19/4185 |
| | | | | 700/19 |
| 2008/0162811 | A1 * | 7/2008 | Steinmetz | G06F 13/4234 |
| | | | | 711/114 |
| 2011/0012430 | A1 * | 1/2011 | Cheng | H01L 31/02021 |
| | | | | 307/82 |
| 2012/0243160 | A1 * | 9/2012 | Nguyen | G06F 1/181 |
| | | | | 361/679.08 |
| 2012/0266027 | A1 * | 10/2012 | Itoyama | G06F 11/079 |
| | | | | 714/42 |
| 2014/0310441 | A1 * | 10/2014 | Klughart | G06F 3/0608 |
| | | | | 710/301 |

* cited by examiner

BASE BOARD ARCHITECTURE FOR A SERVER COMPUTER AND METHOD THEREFOR

CLAIM OF PRIORITY UNDER 35 U.S.C. § 119

The present Application for Patent claims priority to U.S. Provisional Application No. 62/062,400 entitled "BASE BOARD ARCHITECTURE FOR A SERVER COMPUTER AND METHOD THEREFOR", filed Oct. 10, 2014, assigned to the assignee hereof and hereby expressly incorporated by reference herein.

FIELD

The present disclosure generally relates to memory devices for use with computers and other processing apparatuses. More particularly, the present disclosure relates to Serial ATA (Advanced Technology Attachment; SATA) or Serially Attached SCSI (SAS) computer hard disk drives, system interfacing and a simplified tiled architecture for the base plane to provide signals and power to the hard disk drives.

BACKGROUND

Hard disk drives (HDDs) using rotating media are a low-cost and robust solution for permanent storage of data. Current generations of HDDs exist in different form factors, with the 2.5" form factor prevailing in the mobile sector and the 3.5" form factor being the most common solution in desktop, server and workstation environments. The system interface of either of the above form factors may conform to the Serial ATA (SATA) or the Serial Attached SCSI (SAS) standard with the first being prevalent in the consumer market segment and the latter more commonly used in the enterprise market segment.

Contemporary high density storage servers are typically modular designs having a drive enclosure and provisions to plug in additional modules into a server or storage bay. The modules are typically server modules or I/O modules that interface with the outside world through SAS connections. The modules are also typically field-replaceable units (FRUs), whereas the drive enclosure is the main unit of the entire configuration and uses a base board (also referred to as base plane or drive plane) as an interface to the drives. The drives are inserted from the top of the enclosure, which is referred to as top-loading configuration.

Figure 1:
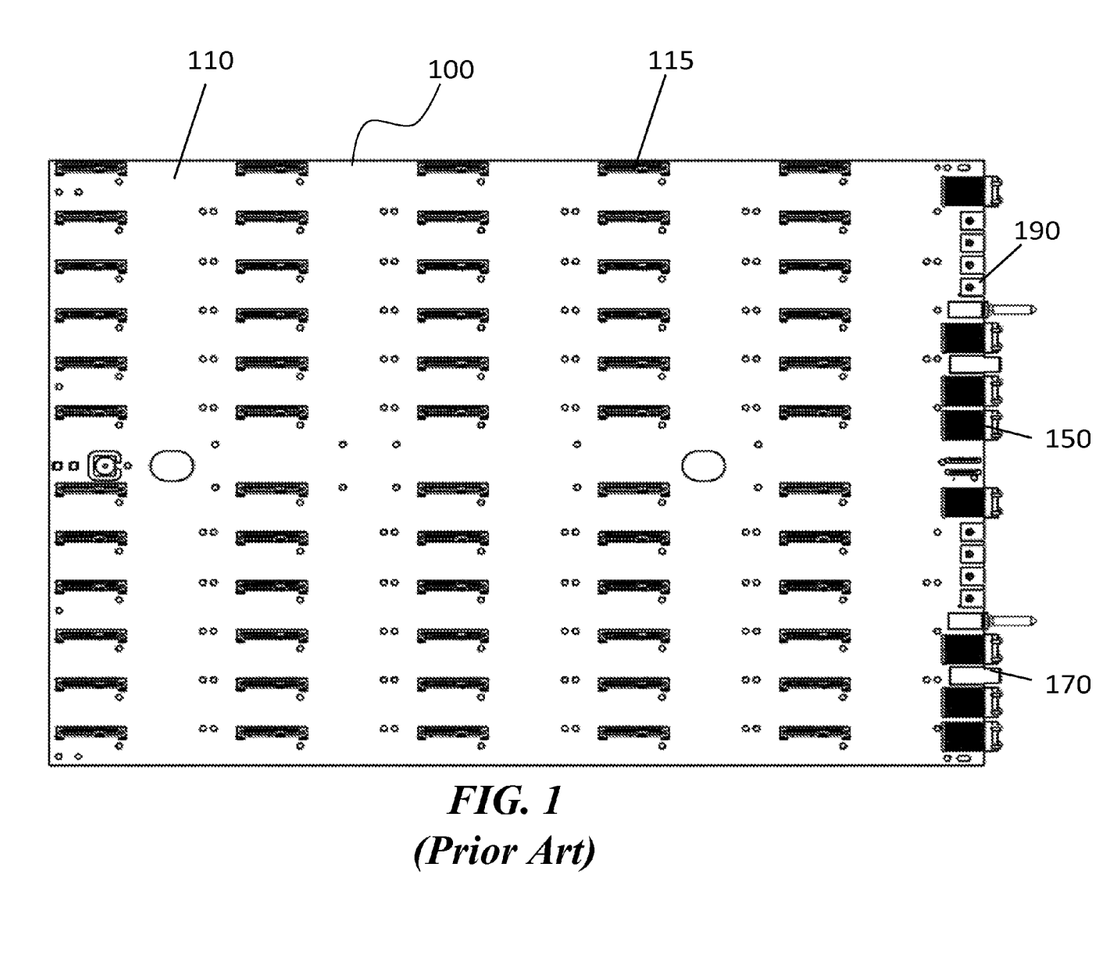
FIG. 1 illustrates a top plan view of a typical base board as used in typical current high density servers.

FIG. 1 illustrates a top plan view of a typical base board 100 as used in current high density servers. The base board 100 includes a printed circuit board 110 having a plurality of female SAS receptacles 115. The printed circuit board 110 may be connected to a compute node, such as a server or I/O module (IOM), for example, via signal connectors that are connected to an I/O controller (IOC) or, more commonly, to a SAS expander on the server or IOM. In addition to the plurality of drive connectors 115, the printed circuit board 110 may also include a plurality of system interface connectors 150, one or more power connectors 170 for connection to the server and/or I/O modules and one or more bus bar tie downs 190.

A commonly used example for the signal connector is the FCI AirMax connector 150. In many current designs, the server or IOM is not directly connected to the power supply of the system but instead receives power through the drive base board via a dedicated power connector 170. In some cases, the base board 110 receives most of the power from the system power supplies via dedicated power connectors, or alternatively, power bus bars that are tied into dedicated bus-bar tie downs.

Storage drives, regardless of whether they are SATA or SAS drives are plugged into the female SAS receptacles 115, compatible with either SAS or SATA drives. These receptacles are soldered onto the base board 100 and connect with the necessary high speed differential signal pairs for transfer and receive (Tx and Rx, respectively) to SAS expanders on the compute or I/O node of the server. Power to the drives is delivered to the drives through dedicated pins on the same connectors.

Figure 2:
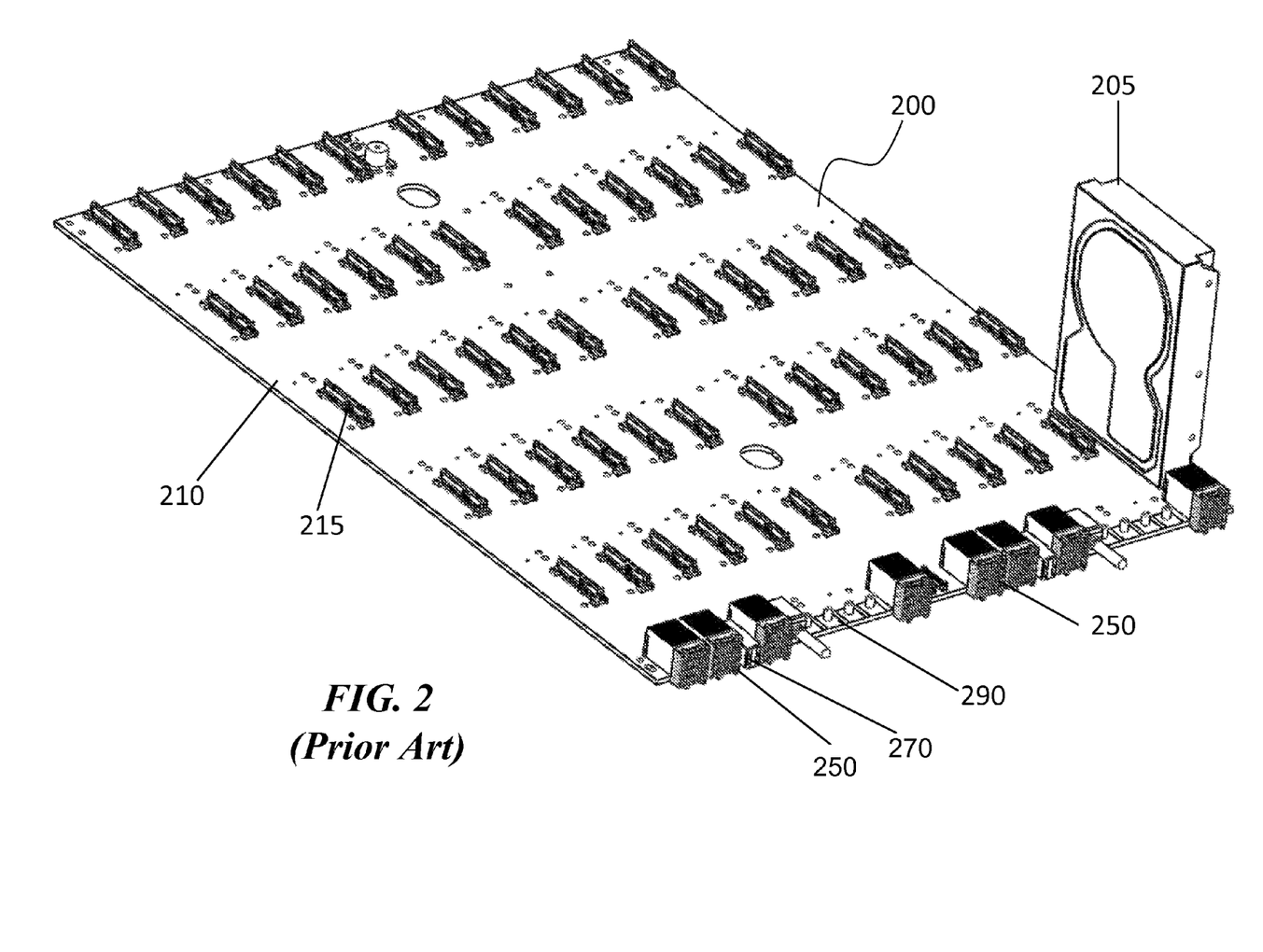
FIG. 2 illustrates a perspective view of the typical base board of FIG. 1 with a HDD inserted into a drive connector.

FIG. 2 illustrates a perspective view of a typical base board 200 with a HDD 205 inserted into a drive connector 215. As shown, the base board 200 includes a printed circuit board 210 having a plurality of drive connectors or female SAS receptacles 215. The printed circuit board may be connected to a server or I/O module (IOM), for example, via signal connectors that are connected to an I/O controller (IOC) or, more commonly, to a SAS expander on the server or IOM. In addition to the plurality of drive connectors 215, the printed circuit board 210 may also include a plurality of system interface connectors 250, one or more power connectors 270 for connection to the server and/or I/O modules and one or more bus bar tie downs 290. For ease of understanding, a 3.5" form factor HDD 205 is shown inserted into one of the available drive connectors.

In the case of SAS drives, signal speed has approached 12 Gb/s, especially in the case of larger enclosures which pose serious problems with respect to maintaining signal integrity across the entire base board. In fact, in many cases, it is not possible to maintain 12 G capability through the entire depth of the base board. Consequently, only a few drives in the locations most proximal to the expander connection are capable of running at the 12 G protocol whereas drives on connectors that exceed a given trace length for their interconnect have to be scaled back to run at a slower speed. Typically drives are scaled back to 6 Gb/s but in some cases, based on the dielectric properties of the circuit board substrate and the length of the traces, signal integrity issues may force the drives to run at 3.0 Gb/s host transfer rate.

In the case of a server using spindle-based hard disk drives (HDDs), 6 Gb/s transfer rates are acceptable, however, a large portion of the storage market is rapidly embracing solid state drives (SSDs) that natively support 12 Gb/s transfers. In this case, the base board or base plane becomes the limiting factor for the operation of the drive.

Better signal integrity can be achieved by using high speed materials, such as iSpeed or IT-150DA laminate, as well as through optimization of trace geometry, that is trace length matching and phase alignment. However, high speed materials which minimize signal loss are expensive and trace optimization requires a significant amount of extra work, especially if traces have to be routed through several layers connected by vias and if the latter have to be manually back-drilled for impedance matching.

In combination, all the above mentioned results in increased cost for high speed base boards. Additionally, different server configurations will require different base boards, each of which will have to be designed from scratch since there is no possibility for carrying over only parts of an existing design without compromising signal integrity.

In view of the aforementioned problems relating to functional enabling high speed signaling on high density server enclosures, it is clear that alternative solutions are necessary.

SUMMARY

The following presents a simplified summary of one or more implementations in order to provide a basic understanding of some implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

According to one aspect, a computer device is provided. The computer device includes a power supply; a compute node; one or more non-volatile memory storage drives in communication with the compute node; and a plurality of base boards coupled to the one or more non-volatile memory storage drives and a high speed interconnect cable to exchange data, to be stored on the plurality of non-volatile memory storage devices, between the plurality of base boards and the compute node. A first base board in the plurality of base boards receives power from the power supply and a second based board in the plurality of base boards receives power from the first base board.

According to one feature, the high speed cable transfers Serial Advanced Technology Attachment, serially attached SCSI or PCIe data packets.

According to another feature, the first base board, the second base board and the computer device are communicatively coupled via a low speed bus. The low speed bus transfers data as low speed signals from the computer device to the first base board through a first connector located on the first base board and from the first base board to the second base board through a second connector located on the second base board. Additionally, a first group of base boards in the plurality of base boards may be integrated with a second group of base boards in the plurality of base boards; and wherein the first and second groups of base boards are configured to couple to different form factors of non-volatile memory storage drives.

According to yet another feature, a third base board is coupled to the second base board for receiving power and the low speed signals through the second base board.

According to yet another feature, the first base board is connected to a first mezzanine card for receiving power and exchanging low speed signals with the computer device; and wherein the first mezzanine card provides connectivity for the high speed signal cable. Furthermore, a first group of base boards in the plurality of base boards may be integrated with a second group of base boards in the plurality of base boards; and wherein the first and second groups of base boards are configured to couple to different form factors of non-volatile memory storage drives According to yet another feature, the first group of base boards form a first plane and the second group of base board form a second plane that is parallel to the first plane but at a different z-height.

According to yet another feature, the second plane is raised above the power supply; and wherein the non-volatile memory storage drives of the first and second groups of base boards are top-loading.

According to yet another feature, a first set of non-volatile memory storage drives in the one or more non-volatile memory storage drives coupled to the first group of base boards are top loading; and wherein a second set of non-volatile memory storage devices in the one or more of non-volatile memory storage devices coupled to the second group are front or back-loading.

According to yet another feature, the one or more non-volatile memory storage drives is coupled to a base board in the plurality of base boards through a SAS or SFF8639 connector; and wherein the SAS or SFF8639 connector is functionally coupled to a high speed data receptacle on the base board.

According to yet another feature, the receptacle is configured to exchange high speed data signals through a cable with the computer device.

According to yet another feature, the base board is one of a plurality of identical base board tiles; and wherein a first identical tile in the plurality of identical base board tiles and a second identical tile in the plurality of identical base board tiles are coupled together to transfer power and low speed control signals.

According to yet another feature, a second mezzanine board interfaces a first group of tiles in the plurality of identical base board tiles with a second group of tiles in the plurality of identical base board tiles.

According to another aspect, a computer device is provided. The computer device includes a first enclosure having a computer server mounted therein; a second enclosure having a plurality of base boards mounted therein and coupled to one or more non-volatile memory storage drives; and high speed interconnect cables to exchange the data to be stored on the computer device between the server and the plurality of base boards; and wherein a first base board in the plurality of base boards receives power from a power supply located in the computer device.

According to one feature, a second base board in the plurality of base boards receives power from the first base board in the plurality of base boards.

According to another feature, the first enclosure is inserted into the second enclosure.

According to yet another feature, the first enclosure and the second enclosure are located in a single rack.

According to yet another feature, the first enclosure and the second enclosure are in physically separate racks.

According to yet another feature, power to the second enclosure is supplied via bus bars.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In the following description, certain terminology is used to describe certain features of one or more embodiments. The term "mass storage device" may refer to a hard disk drive (HDD), a solid state drive, or any type of drive for storing data. Additionally, the term "mass storage device" may refer to other technologies, such as non-volatile memory express (NVMe) technology, for storing data on non-volatile memory devices.

Overview

The present disclosure is directed to solving the problems of signal integrity and development cost of high speed server base boards used in high density or high capacity server computer systems having at least one compute node, server or I/O module (IOM), a power supply unit (PSU) or a power distribution unit (PDU) in any configuration known in the art, including bus bars. In the preferred embodiment, at least a portion of the base board is split into several identical tiles, each of which is capable of supporting four SAS, SATA or NVMe drives. A compute node may be adapted for network connection to a host system that communicates data to and from the compute node.

One feature pertains to an advanced computer device configured for storing data on a plurality of non-volatile memory mass storage devices. The mass storage devices may interface with the computer device through a plurality of base boards mounted in an enclosure that are configured to couple with at least one non-volatile memory storage drive. Each base board may further be configured to couple with a high speed interconnect cable to exchange data to be loaded or stored with the computer device. According to one aspect, the high speed cable transfers Serially Attached SCSI (SAS) or PCIe data packets or frames.

Individual base boards may be daisy changed together for delivery of power and low speed control signals. That is, a first one of the plurality of base boards receives power and control signals from the computer and a second one of the plurality of base boards receives power and control signals from the first one of the plurality of base boards, etc. In one example, low speed control signals may be transferred from the computer device to a first base board through a connector and to a second base board from the first base board through a second connector. A third base board can be added to the second base board for a flexible and expandable configuration, the third base board receives power and low speed control signals from the second board.

In certain configurations, a mezzanine board may be used to receive the first base board and provide power and low speed control signals to the first base board. The mezzanine board may also provide the connectivity for the high speed signal cables through a dedicated connector.

In other certain configurations, two different groups of base boards may be integrated as a functional base board aggregate. The first and second groups of base boards may be configured to couple to different form factors of non-volatile memory storage drives.

In a specific aspect of the present disclosure, one group of base boards may be arranged to form a substantially horizontal drive plane and the second group of base boards may be configured to form a vertical drive plane. In one example, the drives coupled to the first group of base boards may be top loading while the drives coupled to the second group may be front or back-loading.

In another aspect of the present disclosure, the first group of base boards may form a first plane and the second group of base boards may form a second plane that is substantially parallel to the first plane but at a different z-height within the enclosure. In the preferred configuration of this aspect, the second drive plane may reside atop a system power supply unit. If 3.5" drives are installed in a top-loading or vertical orientation on the first group of base board tiles, and 2.5" drives are installed in a top loading or vertical orientation on the second group of base board tiles, the tops of both groups of drive may be substantially co-planar.

In yet a different embodiment of the present disclosure, cable-based integration of the tiled base board with a server or I/O module may be accomplished on a rack-level, that is, server or I/O modules are in a different enclosure than the tiled base board. The latter may be in the same rack as the server or I/O module or may be in a different rack.

In another aspect of the present disclosure, a method is disclosed for interfacing a plurality of high speed mass storage drives with a computer device using a tiled base board architecture, wherein each base board tile may have a SAS or SFF8639 connector to couple with one of the drives and the SAS or SFF8630 connector may be coupled to a high speed data receptacle on the base board tile. The receptacle may be configured to exchange high speed data signals with the computer device through a high speed data cable. Each base board may be one of a number of substantially identical base board tiles and a first one and a second one of the base board tiles can be coupled with each other to transfer power and low speed control signals. The base board tiles can be daisy-chained to allow a third base board to receive power and control signals from the second base board tile. The high speed cable may be suitable to transfer SAS or PCIe data packets.

The first base board may connect to a first mezzanine card interfacing with the computer device to receive power and exchange low speed signals with the computer while the mezzanine card provides connectivity for the high speed signal cable.

The method further allows for integrating different groups of base board tiles configured to couple to different form factors of non-volatile memory mass storage drives, wherein the different groups may be arranged in different orientations, for example in a horizontal and a vertical plane. Drives coupled to the horizontal base boards may be top-loading and drives coupled to the vertical base boards may be front or back-loading.

A second mezzanine card may be used to interface the vertically oriented tiles of a second group with the horizontally oriented tiles of the first group.

In an alternative aspect of the method, a first and a second plane formed by the two different groups of base board tiles may be oriented in parallel but at different z-heights within the enclosure. Drives coupled to the first and the second planes may be top loading.

In yet a different embodiment of the method, the cable-based integration of the tiled base board with a server or I/O module may be done on a rack-level, that is, server or I/O modules may be in a different enclosure than the tiled base board. The latter may be in the same rack as the server or I/O module or may be in a different rack.

In yet another embodiment of the present disclosure, a computer device may be configured for storing data on a plurality of non-volatile memory storage drives comprising a computer server mounted in a first enclosure which is mounted in a computer rack. A plurality of base boards may be mounted in a second enclosure and configured to couple with at least one non-volatile memory storage drive. The base boards may further be configured to couple with a high speed interconnect cable to exchange data to be stored with the computer. A first one of the plurality of base boards may receive power from the computer; and, a second one of the plurality of base boards may receive power from the first one of the plurality of base boards. The first enclosure and the second enclosure may be installed or cohabitated in a single rack but on different levels, i.e. they are not part of the same storage enclosure.

In a specific aspect of the present disclosure, the first enclosure and the second enclosure are not installed in the same rack but in adjacent, physically separate racks.

Power may be supplied to the second enclosure independent of the power provided to the server or I/O module, for example through discrete PSUs and bus bars. Low speed control signals and status signals may be transferred between the server computer and the aggregate tiled base board via a back plane or else via dedicated low speed data cables.

Tiled Base Board Architecture

Figure 3:
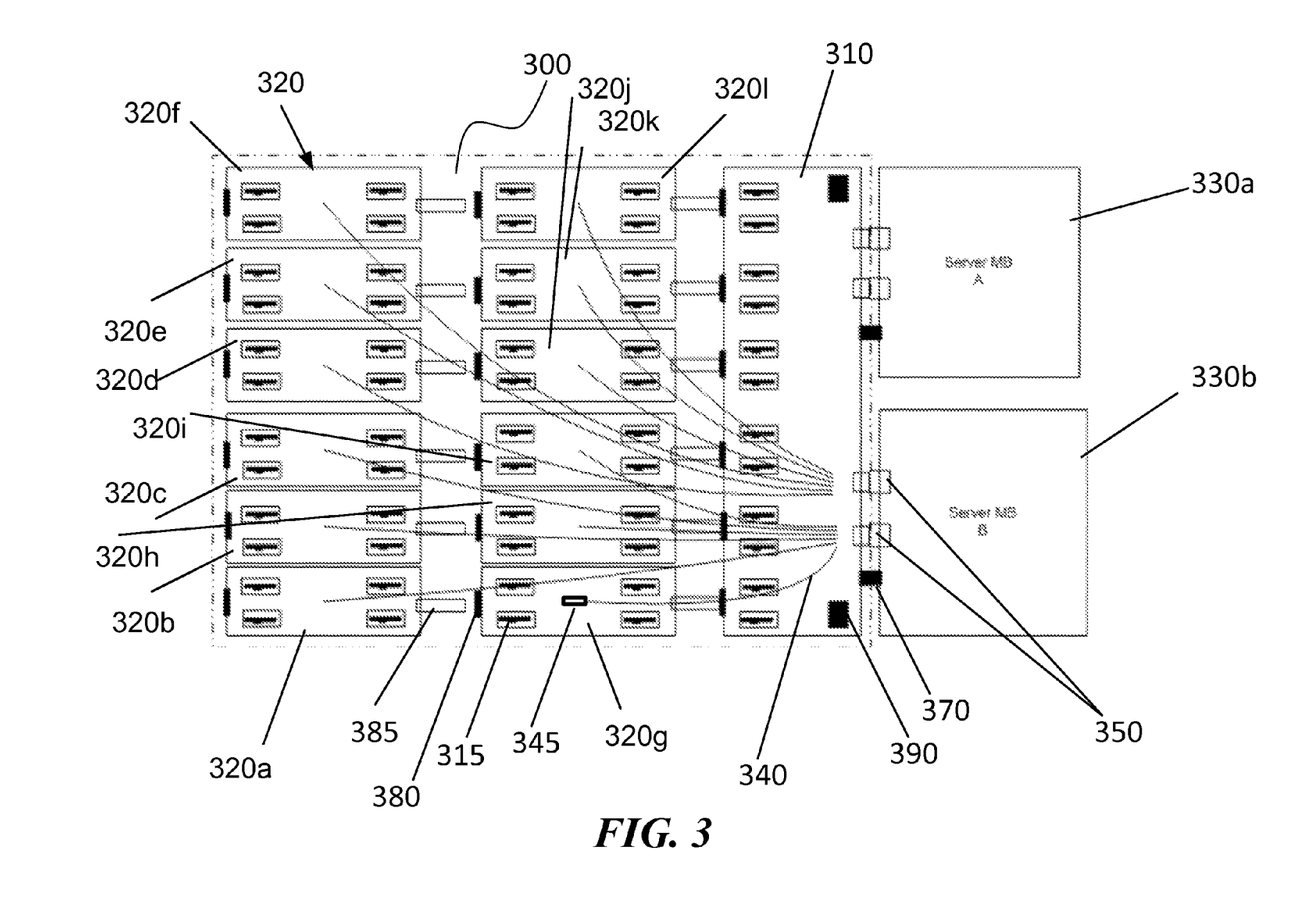
FIG. 3 illustrates a base board divided into a mezzanine printed circuit board and several additional tiles, according to one aspect.

A server base board or base plane (also referred to as drive plane), or part thereof may be divided into a number of identical tiles or else a small number of groups of identical tiles. In some server configurations, there may be a mismatch between the aggregate area coverage of the tiles and the space allocated for drives in the enclosure, in this case, a mezzanine board or else a supplementary board can be used to utilize the additional space. An example of this configuration is shown in FIG. 3 where the base board 300 is divided into a mezzanine printed circuit board 310 and twelve substantially identical tiles 320a-320l. Each tile may include a number of female SAS connectors 315 for delivery of power to the drive and for exchanging data between the drives and the tiles. Alternatively, SFF8639 connectors which are compatible with existing SAS connectors but offer additional signal lanes may be used. Although only one high speed multilane connector 345 is shown on one tile, each tile may further include a high speed multilane connector 345 to interface SAS or PCIe signals with a corresponding connector on the mezzanine board. Corresponding connectors interchange signals with each other via dedicated high speed cables 340. The corresponding connector may be the same high speed multilane connector that is used on the base board tile or it may be physically different. For example, a wider connector supporting more lanes could be used on the mezzanine board to support more than a single tile with SAS or PCIe lanes through a Y-split or hydra cable.

In a specific aspect of the present disclosure, the mezzanine board 310 may receive power from the PSUs or PDUs of the computer system through a dedicated connector 390. A second power connector 370 may provide power to server mother boards 330a and 330b. A third power connector 380, such as a female power connector, may be used to deliver power to the additional base board tiles. The same power connector 380 may be used to propagate power in a daisy-chained tile assembly from one tile to the next one. Additionally, the same power connector 380 may be used to propagate low speed control signals across the tile array.

In another specific aspect of the present disclosure, each tile may include a male power connector 385 to mate with the female power connector 380 on either the mezzanine board or else on another tile. Preferentially, each connector will have separate 5V and 12V rails that are routed to SAS connectors 315 in order to deliver power to the HDDs or SSDs. Additionally, the male power connector 385 may incorporate signal pins to communicate low speed control signals across the array of base board tiles.

Data and control signals may be exchanged between the mezzanine board 310 and the server modules 330a and 330b through a second set of high speed connectors 350 which is different from the high speed multilane connector 345. A typical example for this kind of connector is the FCI AirMax connector 150 as shown in FIGS. 1 and 2.

Figure 4:
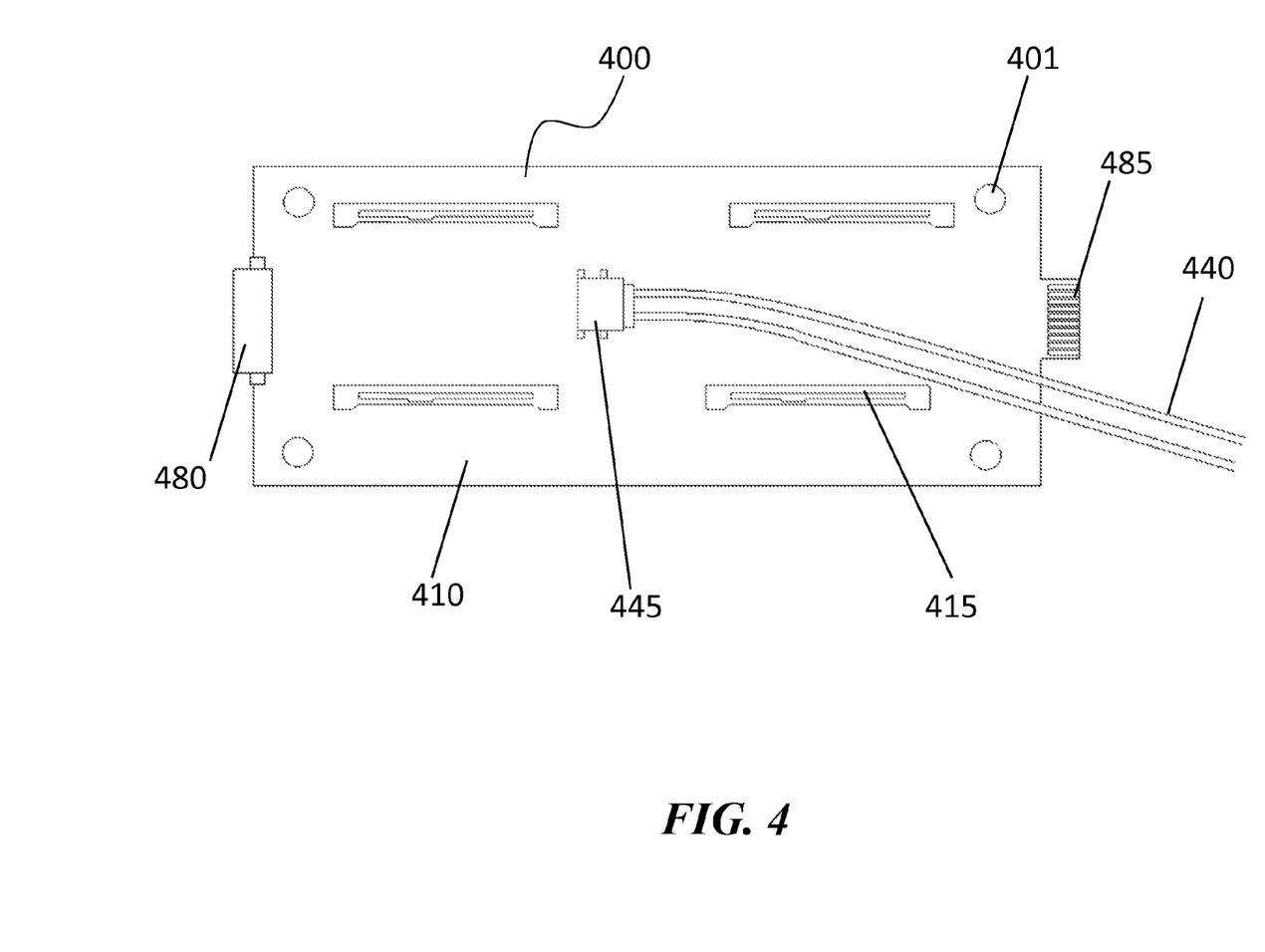
FIG. 4 illustrates a tile of a base board or base plane, according to one aspect.

FIG. 4 shows an exemplary tile 400, according to one aspect. The tile has a printed circuit board 410 which may further include one or more mounting holes 401 to attach the tiles to an enclosure. A high speed connector 445, located approximately at the center of the tile 400, may connect to a high speed cable 440 capable of carrying a plurality of signals, such as high speed differential pairs for transmit and receive data, from the host computer system. The high speed connector 445 may be coupled through traces within the printed circuit board 410 to at least one connector 415 adapted to couple with a non-volatile memory-based storage device. In one example, the connector 415 may be a SAS connector or an SFF8639 connector, however any other suitable connector known in the art may be utilized. On one end, the tile may include a male connector 485 configured to receive power and low speed control signals from the host computer system while on the other end, the tile 400 may include a female receptacle 480 configured to receive a male connector 485 from a second tile.

Figure 5:
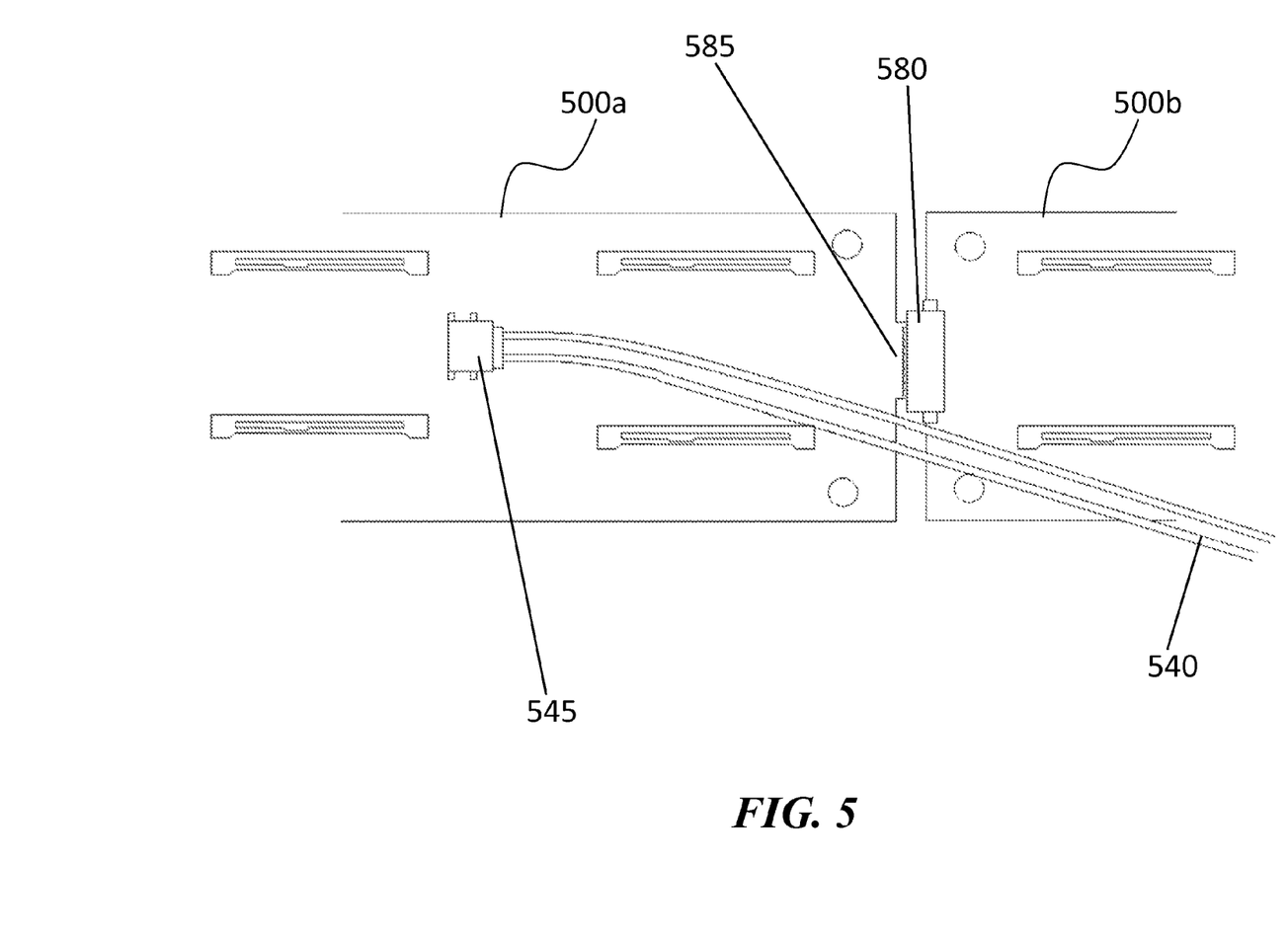
FIG. 5 illustrates interlocking power and low speed signal connections between tiles, according to one aspect.

FIG. 5 illustrates interlocking power connections between tiles, according to one aspect. As shown, power and low speed connections may be coupled between two tiles 500a and 500b where a male connector 585 on the first tile 500a may be inserted into female receptacle 580 on the second tile 500b for power and low speed control signals. Furthermore, a high speed signal cable 540 may be inserted into a high speed signal connector 545.

Figure 6:
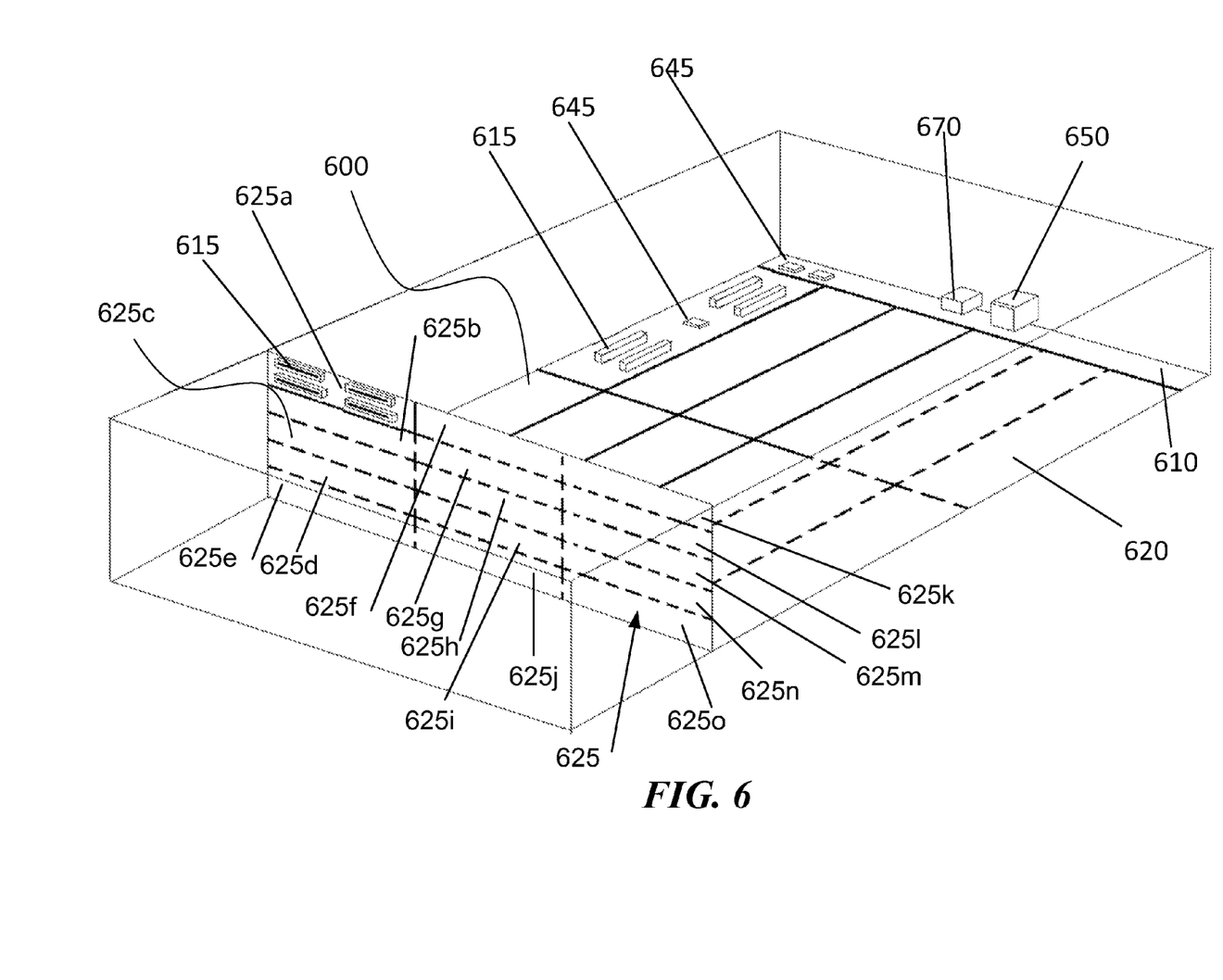
FIG. 6 illustrates an alternative configuration of tiles supporting different form factors.

In another aspect, as shown in FIG. 6, the arrangement of tiles 620 may be different from the arrangement of tiles shown in FIG. 3 in that a mezzanine 610 card may not be configured to accept drives. Furthermore, in addition to power connectors 670, the mezzanine card 610 of FIG. 6 may have only high speed connectors 650 to connect to the server and high speed multilane connectors 645 to connect to the cables routed to tiles 620 but no native SAS or SFF 8639 connectors.

The tiles 620 may be substantially the same as those shown in FIGS. 3-5; however, as there is almost no transmission loss through the cable, the transfer speed may become independent of the relative position of the drive within the system. Accordingly, it is now possible to move the fastest drives to the front of the enclosure, especially in a tiered configuration where the fastest drives will typically be used for caching of data, and by extension be the ones that see the highest load. As a result, these drives will be exposed to the worst level of wear, resulting in a higher than average rate of replacement. For ease of serviceability, therefore, these drives may be arranged in a front loading configuration, that is, they can be pulled out of the enclosure without pulling the enclosure out of the rack, which is necessary in order to open a top loading door. This hybrid arrangement requires a drive plane 625 in vertical orientation relative to the base plane tiles 620 supporting the top-loading drives. The vertical drive plane 625 may be constructed of individual tiles 625a-625o, wherein the number of tiles depends on the number of front-loading drives supported by the system. Each tile may include a number of female SAS connectors 615 for delivery of power to the drive and for exchanging data between the drives and the tiles.

According to one configuration, the drives may be 2.5" form factor solid state drives. The inside height of a 4 U storage enclosure needed for supporting the vertical height of top-loading 3.5" drives is approximately 160 mm In the vertical dive plane 625 the available z-height allows for stacking of ten 2.5" drive slots using standard drive mounting/locking brackets is approximately 15 mm A 19" rack mount enclosure (~17.5" usable width) allows for 6 columns or stacks of 2.5" drives for an aggregate number of 60 drives in a 2.5" form factor that are front-loaded.

Figure 7:
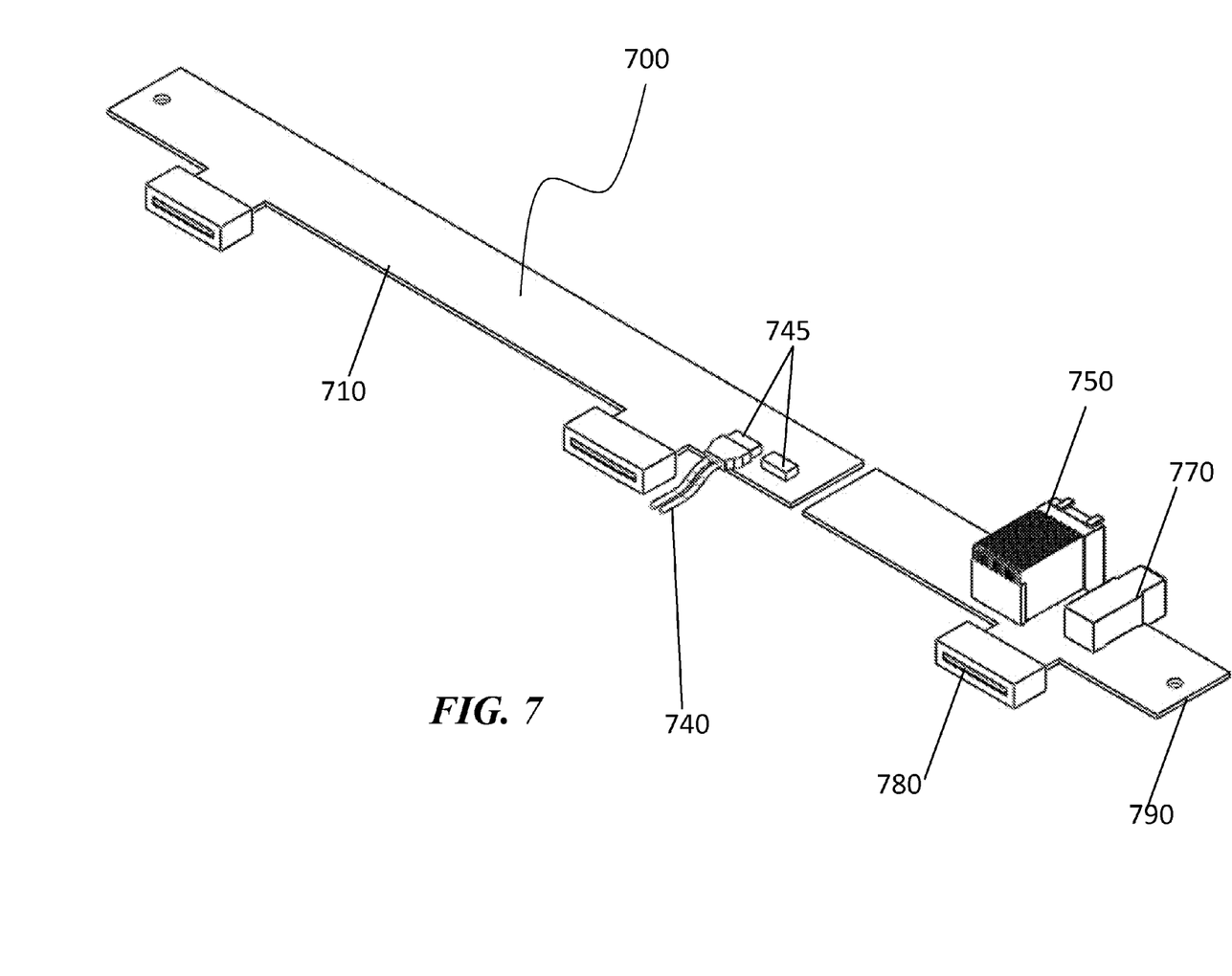
FIG. 7 illustrates a mezzanine board, according to one aspect.

FIG. 7 illustrates an exemplary mezzanine board 700, according to one aspect. The mezzanine board 700 may be used in an arrangement as the one shown in FIG. 6. The mezzanine board 700 may include a printed circuit board 710, a high density interface connector 750 for connecting with a host system, an optional power connector 770 for supplying power to the host system, a bus bar tie down 790 for receiving power from a system power supply unit and one or more high speed interconnect connectors 745 for connecting to cables 740 that route signals to the individual tiles. Power may also be routed to the individual tiles through a female power connector 780 configured to mate with male edge connectors 385 (See FIG. 3) of the tiles.

In the configuration shown in FIG. 6, a vertical drive plane may support an array of front loading drives. For ease of integration, a second mezzanine board (not illustrated in FIG. 6) may be used to translate the horizontal power plane established by the tiles 620 into a second vertical tile array 625 comprising vertically arranged tiles 625a-625o.

Figure 8:
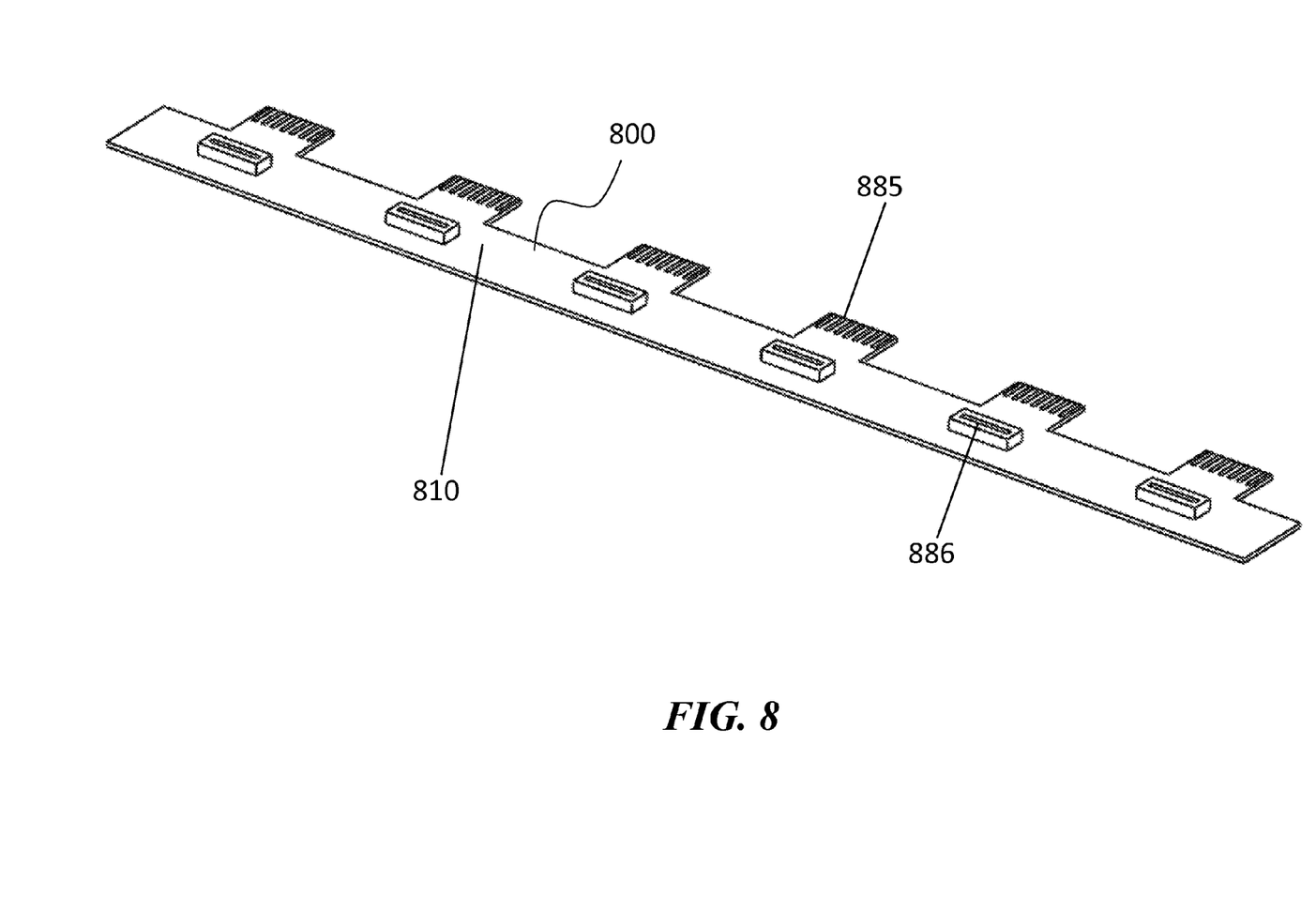
FIG. 8 illustrates a mezzanine board, according to another aspect.

According to another aspect, a mezzanine board 800 as shown in FIG. 8 may be utilized. The mezzanine board 800 may include a printed circuit board 810 with edge connectors 885 configured to connect to female power connectors, such as female power connectors 380 as shown in FIG. 3, of the horizontal tiles. One or more vertical power connectors 886 may be configured to accept the vertical tiles and supply them with power.

Figure 9:
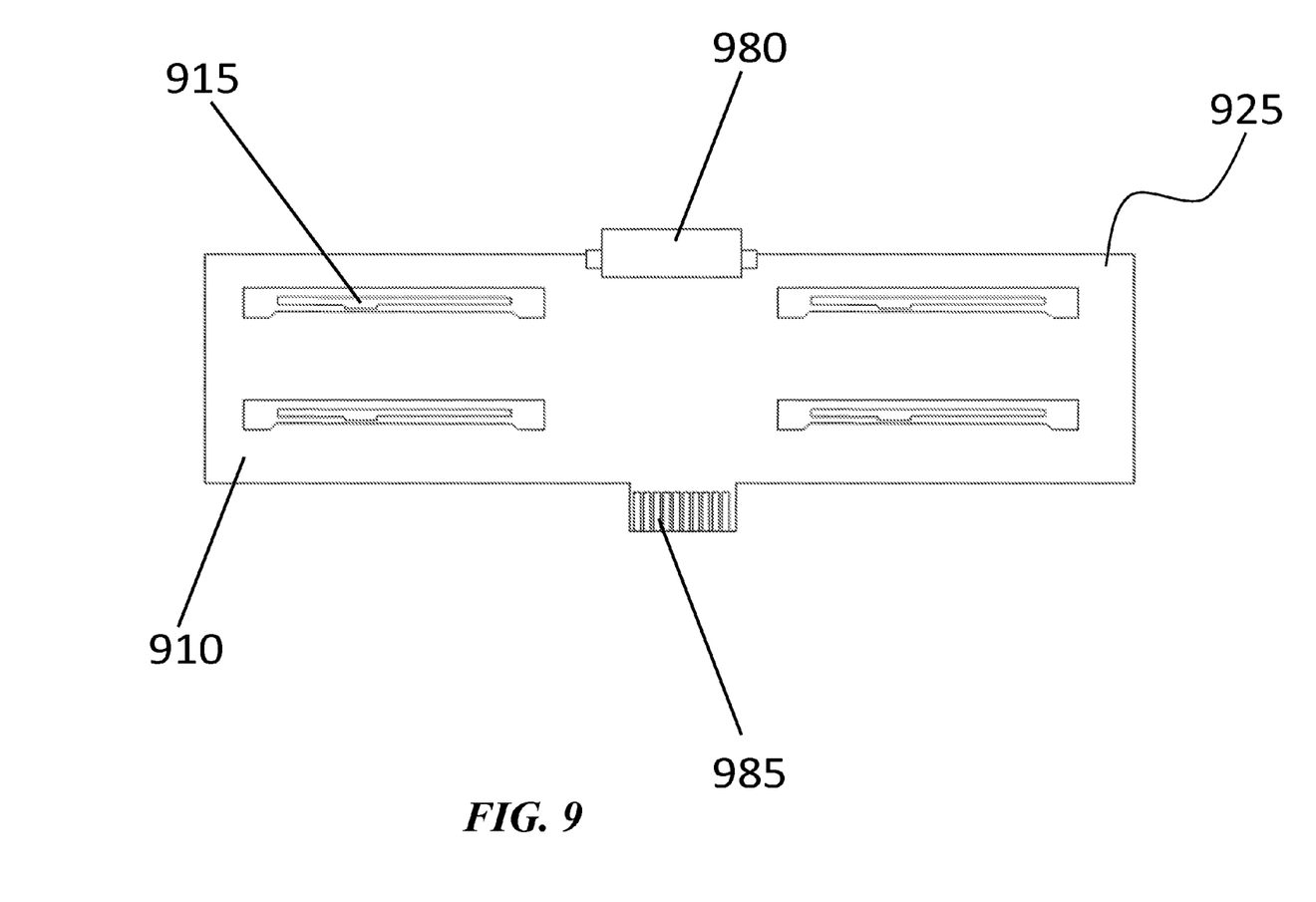
FIG. 9 illustrates a tile of a base board or base plane, according to one aspect.

FIG. 9 illustrates a vertical tile 925 of a base board or base plane, according to one aspect. The vertical tile 925 may include a printed circuit board 910 having a power edge connector 985 and female power receptacle 980 in addition to SAS/SFF8639 connectors 915. A high speed multilane connector configured to receive a cable (such as cable 340 in FIG. 3) may be located on the back side of the printed circuit board 910.

Figure 10A:
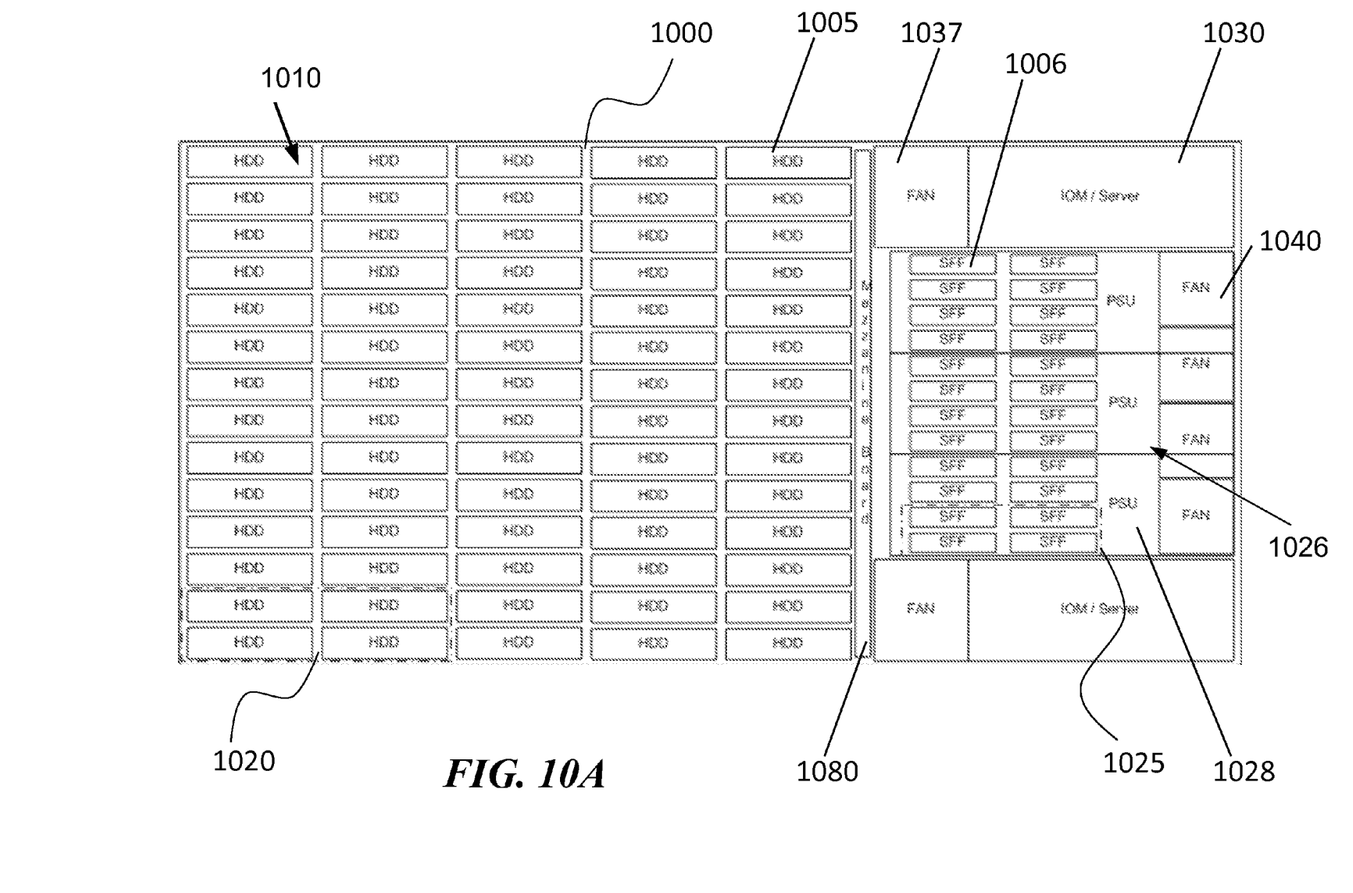
FIGS. 10A and 10B illustrate alternative configurations for a tiled base board aggregate supporting different drive form factors.
Figure 10B:
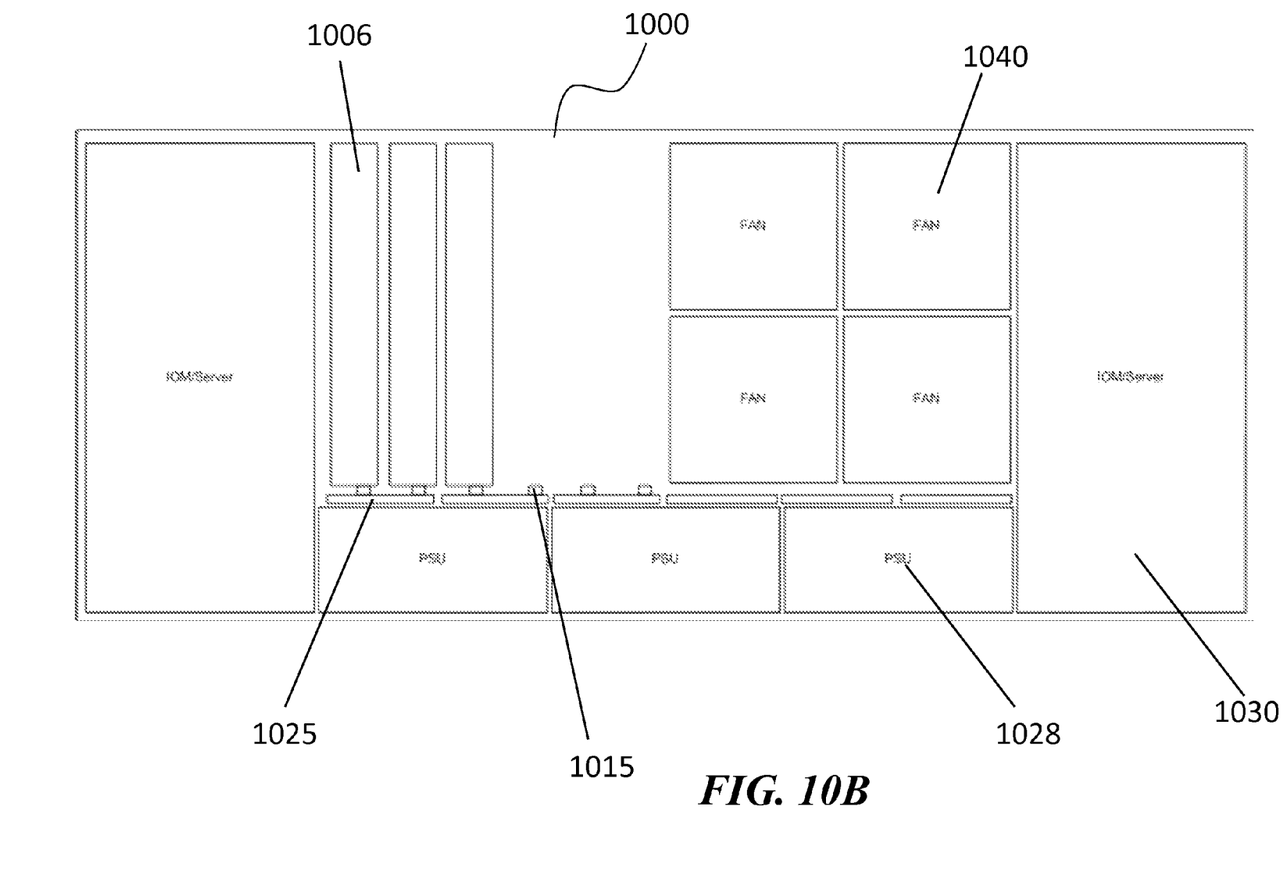

FIGS. 10A and 10B illustrate alternative configurations for a tiled base board aggregate supporting different drive form factors in a high capacity server 1000. As shown in FIG. 10A, a main drive plane 1010 may be divided into substantially identical tiles 1020 to support vertically arranged top-loaded 3.5" HDDs 1005. Although 70 drives are shown, this is by way of example only and there may be more than 70 drives or less than 70 drives. A second drive plane 1025 having support for 24 2.5" drives 1006 is shown adjacent to the main drive plane 1010. In the particular configuration shown, the second drive plane 1025, which is divided into individual tiles 1026, may be flanked on both sides by I/O or server modules 1030. The 2.5" drives 1006 are shorter in length than the 3.5" drives used in the main bulk of the enclosure, the vertical height required for their installation is less, however, it is desirable to have the drives arranged in a manner that allows for their easy accessibility and/or removal through a top-loading door in the enclosure. This results in a raised floor for the second drive plane 1025 and the sub-floor space in this case can efficiently be used to accommodate the system power supplies 1028 including their dedicated power supply fans 1037. Ventilation and cooling of the enclosure may be accomplished through system fans 1040.

The first drive plane 1010 and the second drive plane 1025 may be connected to a mezzanine card 1080 to receive power and exchange low speed signals with a computer.

In addition to SAS or PCIe lanes that are routed via the high speed cables (such as the high speed cables 340 as shown in FIG. 3) to the individual tiles and then distributed to the drives, it may be necessary to route control and status signals to the drives. Typically, each drive may indicate its presence to the host system through a present signal and further communicates activity to the host to trigger an activity LED associated with each drive. Additional signals are SERVICE and FAULT, which may be controlled by the SAS Expander Processor to indicate suspension of activity for service and fault on a drive. Finally, there is a power-off signal that can be used to selectively power down each drive. All these signals are low speed and can be routed through any appropriate bus such as I2C or else a controller area network (CAN) bus including the drive ID to any drive using a multi-drop bus that is routed directly through the daisy-chained tiles using the edge connectors and receptacles on the tiles and mezzanine boards.

In the case of using a CAN bus, the female connectors 480, 580, 780 or 880 (See FIGS. 4, 5, 7 and 8) may auto-terminate the signal unless another down-stream card is inserted. In that case, the female connector on the down-stream card may terminate the bus.

In yet another embodiment of the present disclosure, the server or I/O module may be disaggregated from the tiled base board. Specifically, the server may be on one shelf in a computer rack and the tiled base-board may be mounted in a physically separate enclosure in the same or a different rack and interfaces with the server/I/O module through the same high-speed cable approach as discussed earlier. The protocol used in this case may be SAS or SATA or else PCIe or NVMe or any other emerging protocol. Power to the drives may be supplied through a separate power supply for each tile aggregate or else supplied on a rack-level to all aggregates via cables or bus bars. Low speed control signals between the server or I/O module may be communicated via any suitable protocol including CAN bus or Ethernet.

While the present disclosure has been described in form of specific and preferred embodiments and form factors, it is foreseeable that functionally equivalent designs could be used or subsequently developed to perform the intended functions of the tiled architecture. For example, different types of connector may be implemented to transfer the signals from the server to the cable and further to the baseboard tiles. Also, instead of routing the power in a daisy-chained configuration, bus bars or a second set of power cables may be implemented to supply power to the drives. Therefore, it is apparent that other forms could be adopted by one skilled in the art. Finally, while the appended claims recite certain aspects believed to be associated with the invention and investigations discussed above, they do not necessarily serve as limitations to the scope of the invention.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Accordingly, the various features associate with the examples described herein and shown in the accompanying drawings can be implemented in different examples and implementations without departing from the scope of the disclosure. Therefore, although certain specific constructions and arrangements have been described and shown in the accompanying drawings, such implementations are merely illustrative and not restrictive of the scope of the disclosure, since various other additions and modifications to, and deletions from, the described implementations will be apparent to one of ordinary skill in the art. Thus, the scope of the disclosure is only determined by the literal language, and legal equivalents, of the claims which follow.

What is claimed is:

1. A computer device, comprising:
   a power supply;
   a compute node;
   one or more non-volatile memory storage drives, in communication with the compute node, for storing data; and
   a plurality of base boards where each base board in the plurality of base boards has an upper surface and an opposing lower surface forming a plurality of upper surfaces and lower surfaces;
   one or more connectors mounted on the upper surface of the each base board in the plurality of base boards, the one or more non-volatile memory storage drives connected to the one or more connectors;
   a plurality of high speed interconnect cables, a cable in the plurality of high speed interconnect cables mounted to each of the lower surfaces in each of the plurality of lower surfaces of each of the plurality of base boards for transmitting and receiving the data with the compute node;
   wherein each high speed interconnect cable in the plurality of high speed internet cables establishes a private connection of the each base board with the compute node;
   wherein a first base board in the plurality of base boards receives power from the power supply; and
   wherein a second base board in the plurality of base boards receives power from the first base board.

2. The computer device of claim 1, wherein the high speed interconnect cable transfers Serial Advanced Technology Attachment, serially attached SCSI or PCIe data packets.

3. The computer device of claim 2, wherein the first base board, the second base board and the computer device are communicatively coupled via a low speed bus which transfers data as low speed signals from the compute node to the first base board through a first connector located on the first base board and from the first base board to the second base board through a second connector located on the second base board.

4. The computer device of claim 3, wherein a third base board is coupled to the second base board for receiving power and the low speed signals.

5. The computer device of claim 3, wherein the first base board is connected to a first mezzanine card for receiving power and exchanging low speed signals with the compute node; and wherein the first mezzanine card provides connectivity for the high speed signal cable.

6. The computer device of claim 3, wherein a first group of base boards in the plurality of base boards is integrated with a second group of base boards in the plurality of base boards; and wherein the first and second groups of base boards are configured to couple to different form factors of non-volatile memory storage drives.

7. The computer device of claim 5, wherein a first group of base boards in the plurality of base boards is integrated with a second group of base boards in the plurality of base boards; and wherein the first and second groups of base boards are configured to couple to different form factors of non-volatile memory storage drives.

8. The computer device of claim 6, wherein the first group of base boards form a first plane and the second group of base boards form a second plane that is parallel to the first plane but at a different z-height.

9. The computer device of claim 8, wherein the second plane is raised above the power supply; and wherein the non-volatile memory storage drives of the first and second groups of base boards are top-loading.

10. The computer device of claim 9, wherein a first set of non-volatile memory storage drives in the one or more of non-volatile memory storage drives coupled to the first group of base boards are top loading; and wherein a second set of non-volatile memory storage devices in the one or more of non-volatile memory storage devices coupled to the second group are front or back-loading.

11. The computer device of claim 1, wherein the one or more non-volatile memory storage drives is coupled to a base board in the plurality of base boards through a SAS or SFF8639 connector; and wherein the SAS or SFF8639 connector is functionally coupled to a high speed data receptacle on the base board.

12. The computer device of claim 11, wherein the receptacle is configured to exchange high speed data signals through a data cable with the computer device.

13. The computer device of claim 12, wherein the base board is one of a plurality of identical base board tiles; and wherein a first identical tile in the plurality of identical base board tiles and a second identical tile in the plurality of identical base board tiles are coupled together to transfer power and low speed control signals.

14. The computer device of claim 13, wherein a second mezzanine board interfaces a first group of tiles in the plurality of identical base board tiles with a second group of tiles in the plurality of identical base board tiles.

15. A computer device, comprising:
   a first enclosure having a computer server mounted therein;
   a second enclosure having a plurality of base boards where each base board in the plurality of base boards has an upper surface and an opposing lower surface, the second enclosure in communication with the first enclosure;

one or more connectors mounted on the upper surfaces of the plurality of base boards;

one or more non-volatile memory storage drives connected to the one or more connectors;

high speed interconnect cables mounted to the lower surfaces of the plurality of base boards for exchanging data between the server in the first enclosure and the plurality of base boards in the second enclosure; and wherein each high speed internet cable establishes a private connection of the each base board with the compute node; and wherein a first base board in the plurality of base boards receives power from a power supply located in the computer device.

16. The computer device of claim 15, wherein a second base board in the plurality of base boards receives power from the first base board in the plurality of base boards.

17. The computer device of claim 15, wherein the first enclosure is inserted into the second enclosure.

18. The computer device of claim 15, wherein the first enclosure and the second enclosure are located in a single rack.

19. The computer device of claim 15, wherein the first enclosure and the second enclosure are in physically separate racks.

20. The computer device of claim 15, wherein power to the second enclosure is supplied via bus bars.

* * * * *